US008412528B2

(12) United States Patent
Fischer et al.

(10) Patent No.: US 8,412,528 B2
(45) Date of Patent: Apr. 2, 2013

(54) BACK-END DATABASE REORGANIZATION FOR APPLICATION-SPECIFIC CONCATENATIVE TEXT-TO-SPEECH SYSTEMS

(75) Inventors: Volker Fischer, Leimen (DE); Siegfried Kunzmann, Heidelberg (DE)

(73) Assignee: Nuance Communications, Inc., Burlington, MA (US)

( * ) Notice: Subject to any disclaimer, the term of this patent is extended or adjusted under 35 U.S.C. 154(b) by 950 days.

(21) Appl. No.: 11/416,217

(22) Filed: May 2, 2006

(65) Prior Publication Data

US 2006/0287861 A1 Dec. 21, 2006

(30) Foreign Application Priority Data

Jun. 21, 2005 (EP) ...................................... 5105449

(51) Int. Cl.
*G01L 13/00* (2006.01)
*G01L 13/06* (2006.01)

(52) U.S. Cl. ........................................ 704/258; 704/260

(58) Field of Classification Search .................. 704/258, 704/260, 266

See application file for complete search history.

(56) References Cited

U.S. PATENT DOCUMENTS

| | | | | |
|---|---|---|---|---|
| 6,029,132 | A * | 2/2000 | Kuhn et al. | 704/260 |
| 6,081,774 | A * | 6/2000 | de Hita et al. | 704/9 |
| 7,328,157 | B1 * | 2/2008 | Chu et al. | 704/260 |
| 2002/0087314 | A1 * | 7/2002 | Fischer et al. | 704/255 |
| 2002/0095282 | A1 * | 7/2002 | Goronzy et al. | 704/10 |
| 2002/0120450 | A1 * | 8/2002 | Junqua et al. | 704/258 |
| 2003/0055641 | A1 * | 3/2003 | Yi et al. | 704/238 |
| 2004/0015478 | A1 * | 1/2004 | Pauly | 707/1 |
| 2005/0131676 | A1 * | 6/2005 | Ghasemi et al. | 704/201 |
| 2006/0069566 | A1 * | 3/2006 | Fukada et al. | 704/260 |
| 2006/0074674 | A1 * | 4/2006 | Zhang et al. | 704/260 |

OTHER PUBLICATIONS

Fischer et al. "Domain adaptation methods in the IBM trainable text-to-speech system", ICSLP, Oct. 2004.*
Cronk et al. "Optimized stopping criteria for Tree-based unit selection in concatenative synthesis", ICSLP, 2002.*
Kain et al. "Text-to-speech voice adaptation from sparse training data", ICSLP, 1998.*
Hunt et al. "Unit selection in a conccatenative speech synthesis system using a large speech database", ICASSP, 1996.*
Yamagishi et al. "Speaking Style Adaptation Using Context Clustering Decision Tree for HMM-Based Speech Synthesis", IEEE ICASSP, 2004.*
Chu et al. "Domain Adaptation for TTS system", IEEE ICASSP 1992.*

* cited by examiner

*Primary Examiner* — Jialong He

(74) *Attorney, Agent, or Firm* — Wolf, Greenfield & Sacks, P.C.

(57) ABSTRACT

The present invention relates to computer-generated text-to-speech conversion. It relates in particular to a method and system for updating a Concatenative Text-To-Speech (CTTS) system with a speech database from a base version to a new version. The present invention performs an application-specific re-organization of a synthesizer's speech database by means of certain decision tree modifications. By that reorganization, certain synthesis units are made available for the new application, which are not available in prior art without a new speech session. This allows the creation of application-specific synthesizers with improved output speech quality for arbitrary domains and applications at very low cost.

25 Claims, 5 Drawing Sheets

INVENTIONAL UPDATE

INVENTIONAL UPDATE

BACK-END DATABASE REORGANIZATION FOR APPLICATION-SPECIFIC CONCATENATIVE TEXT-TO-SPEECH SYSTEMS

CROSS-REFERENCE TO RELATED APPLICATIONS

This application claims the benefit of European Patent Application No. EP5105449.2 filed Jun. 21, 2005.

BACKGROUND

1. Field of the Invention

The present invention relates to computer-generated text-to-speech conversion, and, more particularly, to updating a Concatenative Text-To-Speech (CTTS) system with a speech database from a base version to a new version.

2. Description of the Related Art

Natural speech output is one of the key elements for a wide acceptance of voice enabled applications and is indispensable for interfaces that can not make use of other output modalities, such as plain text or graphics. Recently, major improvement in the field of text-to-speech synthesis has been made by the development of so-called "corpus-based" methods: systems such as the IBM trainable text-to-speech system or AT&T's NextGen system make use of explicit or parametric representations of short segments of natural speech, referred to herein as "synthesis units," that are extracted from a large set of recorded utterances in a preparative synthesizer training session, and which are retrieved, further manipulated, and concatenated during a subsequent speech synthesis runtime session.

In more detail, and with a particular focus on the disadvantages of prior art, such methods for operating a CTTS system include the following features:

a) The CTTS system uses natural speech—stored in either its original form or any parametric representation—obtained by recording some base text, which is designed to cover a variety of envisaged applications;

b) In a preparative step (synthesizer construction) the recorded speech is dissected by a respective computer program into synthesis units, which are stored in a base speech database;

c) The synthesis units are distinguished in the base speech database with respect to their acoustic and/or prosodic contexts, which are derived from and thus are specific for said base text; and d) Synthetic speech is constructed by a concatenation and appropriate modification of the synthesis units.

FIG. 1 depicts a prior art schematic block diagram CTTS system. According to FIG. 1, prior art speech synthesizers 10 basically execute a run-time conversion from text to speech, where speech is shown by audio arrow 15. For that purpose, a linguistic front-end component 12 of system 10 performs text normalization, text-to-phone unit conversion (baseform generation), and prosody prediction, i.e. creation of an intonation contour that describes energy, pitch, and duration of the required synthesis units. Intonation and pauses for the text are specified at this pre-processing stage.

The pre-processed text, the requested sequence of synthesis units, and the desired intonation contour are passed to a back-end concatenation module 14 that generates the synthetic speech in a synthesis engine 16. For that purpose, a back-end database 18 of speech segments is searched for units that best match the acoustic/prosodic specifications computed by the front-end. The back-end database 18 stores an explicit or parametric representation of the speech data.

Synthesis units, such as phones, sub-phones, diphones, or syllables, are well known to sound different when articulated in different acoustic and/or prosodic contexts. Consequently, a large number of these units have to be stored in the synthesizer's database in order to enable the system to produce high quality speech output across a broad variety of applications or domains. For combinatorial and performance reasons, it is prohibitive to search all instances of a required synthesis unit during runtime. Accordingly, a fast selection of suitable candidate segments is generally performed based upon to previously established criterion, and not performed based upon the entirety of synthesis units in the synthesizer's database.

With reference to FIG. 2 in state-of-the-art, conventional systems this is usually achieved by taking into consideration the acoustic and/or prosodic context of the speech segments. For that purpose, decision trees for the identification of relevant contexts are created during system construction 19. The leaves of these trees represent individual acoustic and/or prosodic contexts that significantly influence the short term spectral and/or prosodic properties of the synthesis units, and thus their sound. The traversal of these decision trees during runtime is fast and restricts the number of segments to consider in the back-end search to only a few out of several hundreds or thousands.

While concatenative text-to-speech synthesis is able to produce synthetic speech of remarkable quality, it is also true that such systems sound most natural for applications and/or domains that have been thoroughly covered by the recording script (i.e., the above-mentioned base text) and are thus present in the speech database. Different speaking styles and acoustic contexts are only two reasons that help to explain this observation.

Since it is impossible to record speech material for all possible applications in advance, both the construction of synthesizers for limited domains and adaptation with additional, domain-specific prompts, have been proposed in the literature. Limited domain synthesis constructs a specialized synthesizer for each individual application. Domain adaptation adds speech segments from a domain-specific speech corpus to an already existing, general synthesizer.

Referencing FIG. 3, when an existing CTTS system is to be updated in order to either adapt it to a new domain or to deal with changes made to existing applications (e.g. a re-design of the prompts to be generated by a conversational dialog system), in prior art methods and systems a step is performed of specifying a new, domain/application specific text corpus 31, which usually is not covered by the basic speech database. Disadvantageously, the new text 31 must be read by a professional human speaker in a new recording session 32, and the system construction process (shown in FIG. 2) needs to be carried out in order to generate a speech database 18 adapted to the new application.

Therefore, while both approaches, limited domain synthesis and domain adaptation, can help to increase the quality of synthetic speech for a particular application, these methods are disadvantageously time-consuming and expensive, since a professional human speaker (preferably the original voice talent) has to be available for the update speech session, and because of the need for expert phonetic-linguistic skills in the synthesizer construction step (shown in FIG. 2).

SUMMARY OF THE INVENTION

Prior art unit selection based text-to-speech systems can generate high quality synthetic speech for a variety of applications, but achieve best results for domains and applications that are covered in the base recordings used for synthesizer construction. Prior art methods for the adaptation of a speech synthesizer towards a particular application demand the recording of additional human speech corpora covering additional application-specific text, which is time consuming and expensive, and ideally requires the availability of the original voice talent and recording environment.

The domain adaptation method disclosed in the present invention overcomes this problem. By making use of statistics generated during the CTTS system runtime, the present invention examines the acoustic and/or prosodic contexts of the application-specific text, and re-organizes the speech segments in the base database according to newly created contexts. The latter is achieved by application-specific decision tree modifications. Thus, in contrast to prior art, adaptation of a CTTS system according to the present invention requires only a relatively small amount of application-specific text, and does not require additional speech recordings. The present invention, therefore, allows the creation of application-specific synthesizers with improved output speech quality for arbitrary domains and applications at very low cost.

The present invention can be implemented in accordance with numerous aspects consistent with material presented herein. For example, one aspect of the present invention can include a method and respectively programmed computer system for updating a Concatenative Text-To-Speech System (CTTS) with a speech database from a base version to a new version. The CTTS system can use segments of natural speech, stored in its original form or any parametric representation, which is obtained by recording a base text. The recorded speech can be dissected into synthesis units including, but not limited to, subphones (such as a ⅓ phone), phones, diphones, and syllables. Speech can be synthesized by a concatenation and modification of the synthesis units. The base speech database can include base of acoustic and/or prosodic context classes derived from and thus matching said base text.

A method of updating to a new data base better suited for synthesizing text from a predetermined target application can include specifying a new text corpus subset that is not completely covered by the base speech database. Acoustic contexts from the base version speech database that are present in the target application can be collected. Acoustic context classes which remain unused when the CTTS system is used for synthesizing new text of the target application can be discarded. New context classes can be created from the discarded classes. The speech database can be re-indexed to reflect the newly created context classes.

In one embodiment, the speech segments can be organized in a clustered hierarchy of subsets of speech segments, or even in a tree-like hierarchy. This organization provides a fast runtime operation.

Both the removal of unused acoustic and/or prosodic contexts and the creation of new context classes can be implemented as operations on decision trees, such as pruning (removal of subtrees) and split-and-merge (for the creation of new subtrees).

The method can be enriched advantageously with a weighting function. One such weighting function can analyze which of the synthesis units under a single given leaf is used with which frequency. The speech database update procedure can be triggered without human intervention, when a predetermined condition is met. This function can be customized to the new speech database relatively small, which speeds up the segment search, thus improving the scalability of the application. The function also allows the speech database to be updated without a significant human intervention.

In one embodiment, the method can be advantageously applied for portlets each producing a voice output. Each of the portlets can be equipped with a portlet-specific database.

The present invention can be performed automatically without a human trigger, i.e., an "online-adaptation." An automatically triggered embodiment can include a step of collecting CTTS-quality data during runtime of the CTTS system. The system can check for a predetermined CTTS update condition. A speech database update procedure can be automatically performed when the predetermined CTTS update condition is met.

Benefits of the invention can result from an ability to adapt a speech database without requiring an additional recording of application specific prompts. Specific benefits can include: improved quality of synthetic speech achieved without additional costs; an increase in application lifecycle, since adaptation can be applied whenever the design of the application changes; and, lower skill levels needed for creation and maintenance of speech synthesizers for specific domains, since the invention is based only upon domain specific text.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
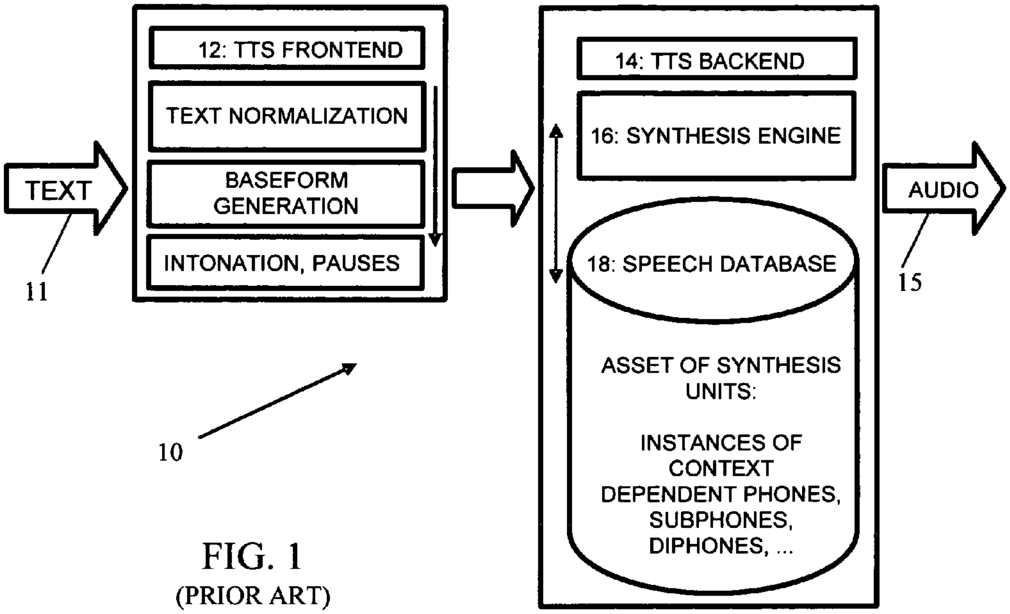
FIG. 1 (PRIOR ART)
FIG. 1 is a prior art schematic block diagram representation of a CTTS and its basic structural and functional elements.
Figure 2:
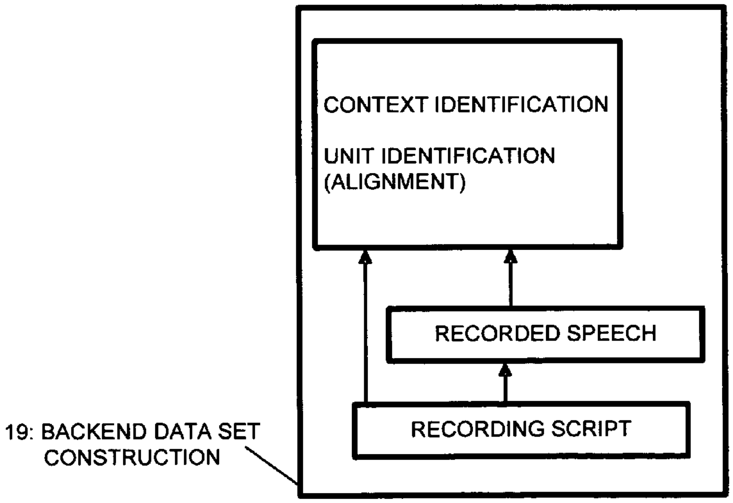
FIG. 2 (PRIOR ART)
FIG. 2 is a schematic block diagram showing details of the dataset construction for the back-end system in FIG. 1.
Figure 3:
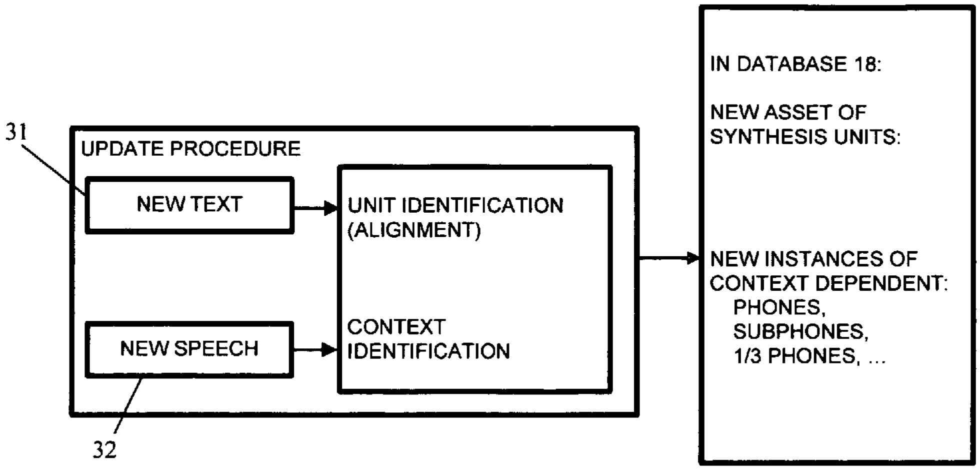
FIG. 3 (PRIOR ART)
FIG. 3 is a prior art schematic block diagram overview representation when a CTTS is updated to a new user application.

The present invention adapts a general domain Concatenative Text-to-Speech (CTTS) system for a target application.

The invention presupposes that a speech synthesizer uses one or more decision trees or a decision network for a selection of candidate speech segments. These candidate speech segments are subject to further evaluation by the concatenation engine's search module. The target application is defined by a representative, but not necessarily exhaustive, text corpus. Accordingly, the invention teaches a method for decision tree adaptations for fast selection of candidate speech segments at runtime for target applications, where additional speech recordings are not necessary to tailor the CTTS system decision tree structure to the target application, which is the case for conventional CTTS implementations.

It should be noted that while many examples for the present invention are phrased in terms of decision tree adaptation in an acoustic context, the invention can be applied in other contexts. For example, the present invention can apply to the adaptation of decision trees used by a synthesizer for the computation of loudness, pitch, duration, and the like.

Further, the inventive arrangements detailed herein are not to be construed as limited to decision tree implementations. The invention can also be implemented for other tree-like data structures, such as a hierarchy of speech segment clusters. In a hierarchy, the present invention can be used for finding a set of candidate speech segments that best match the requirements imposed by the CTTS systems's front-end. In a hierarchy case, instead of being used to find an appropriate decision tree leaf, the invention can be used to identify a cluster (subset of speech segments) based upon a distance measurement that best matches front-end requirements. The adaptive tree traversal tailored for a target application remains the same for the hierarchy of speech segment clusters implementation as it does for the decision tree embodiment.

In order to allow a fast selection of candidate speech segments during runtime, decision trees for each synthesis unit (e.g., for phones or, preferably, sub-phones) are trained as part of the synthesizer construction process, and the same decision trees are traversed during synthesizer runtime.

Decision tree growing divides the general domain training data aligned to a particular synthesis unit into a set of homogeneous regions, i.e. a number of clusters with similar spectral or prosodic properties, and thus similar sound. It does so by starting with a single root node holding all the data, and by iteratively asking questions about a unit's phonetic and/or prosodic context, e.g., of the form:

Is the phone to the left a vowel?

Is the phone two positions to the right a plosive?

Is the current phone part of a word-initial syllable?

In each step of the process, the question that yields the best result with respect to some pre-defined measurement of homogeneity is stored in the node, and two successor nodes are created which hold all data that yield a positive (or negative, respectively) answer to the selected question. The process stops, if a given number of leaves, i.e., nodes without successors, are reached.

During runtime, after baseform generation by the synthesizer's front-end, the decision tree for each required synthesis unit is traversed from top to bottom by asking the question stored in each node and following the respective YES- or NO-branch until a leaf node is reached. The speech segments associated to these leaves are now suitable candidate segments from which the concatenation engine has to select the segment that, in terms of a pre-defined cost function, best matches the requirements imposed by the front-end as well as the already synthesized speech.

If text from a new domain or application has to be synthesized, the same runtime procedure is carried out using the general domain synthesizer's decision tree. However, since the decision tree was designed to discriminate speech segments according to the acoustic and/or prosodic contexts in the training data, traversal of the tree will frequently end in the very same leaves, therefore making only a small fraction of all speech segments available for further search. As a consequence, the prior art back-end may search a list of candidate speech segments that are less suited to meet the prosody targets specified by the front-end, and output speech of less than optimal quality will be produced.

Domain specific adaptation of context classes, as provided by the present invention, will overcome this problem by altering the list of candidate speech segments, thus allowing the back-end search to access speech segments that potentially better match the prosodic targets specified by the front-end. Thus, better output speech is produced without the incorporation of additionally recorded domain specific speech material, as it is required by prior art synthesizer adaptation methods.

Figure 5:
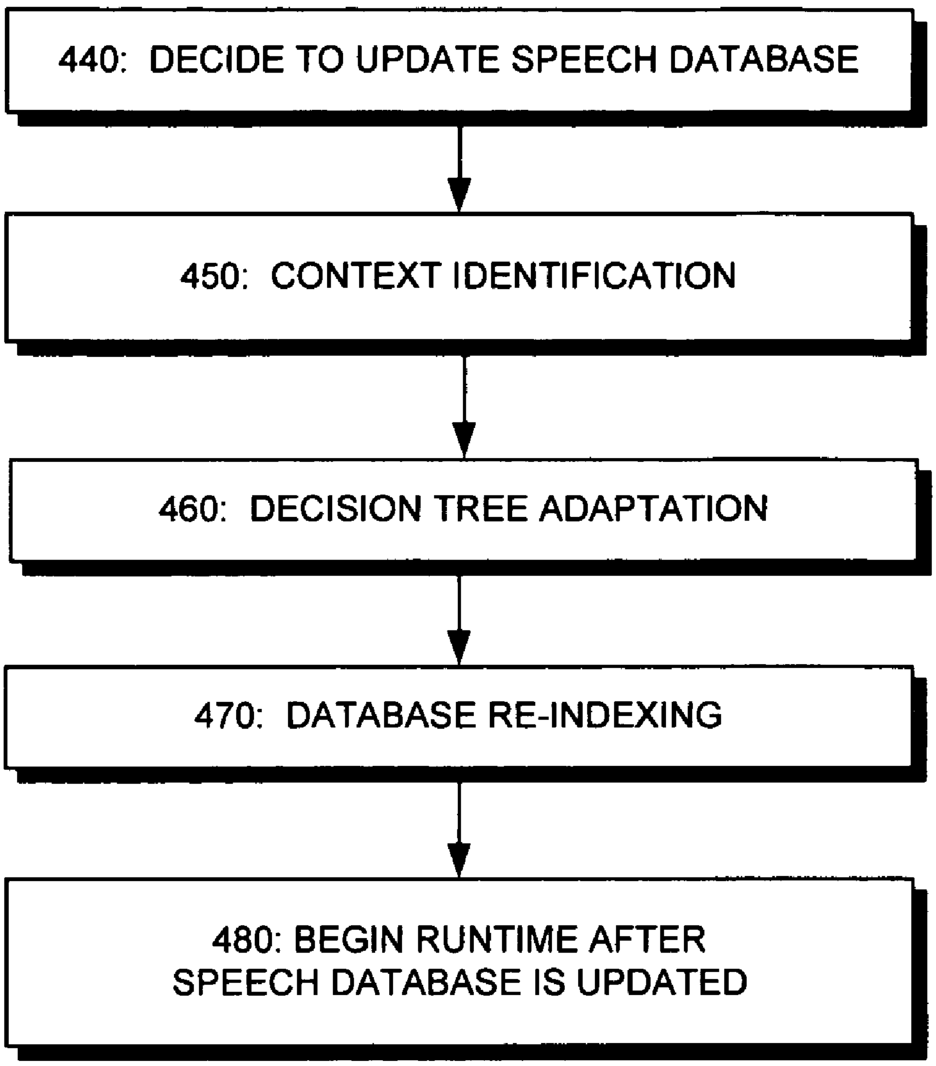
FIG. 5 is a flow chart illustrating a method for updating a speech synthesis database in accordance with an embodiment of the inventive arrangements disclosed herein.

For the purpose of domain adaptation, the steps shown in FIG. 5 are generally performed, where FIG. 5 is a flow chart illustrating a method for updating a speech synthesis database in accordance with an embodiment of the inventive arrangements disclosed herein. As shown by step 440, a decision to update a speech database for a target application is made. In step 450, context identification is performed. In context identification, a back-end program component can collect acoustic contexts from a domain decision tree for a general domain synthesizer that are present in a new text corpus for the target application.

In step 460, decision tree adaptation occurs, where new context classes are created. This creation of context classes can utilize decision tree pruning and/or refinement techniques.

In step 470, the speech data base used by the target application can be re-indexed. This step can tag the synthesizer's speech database according to the newly created context classes. Database size for the target application can be optionally reduced to increase searching speech.

In step 480, after the database or tree structure used for fast candidate selection is updated, which can occur automatically at runtime, speech synthesis tasks can be performed. It should be emphasized that the database or tree structure is updated for the target application without requiring additional speech recordings, as would be the case for a conventionally implemented system.

Figure 4:
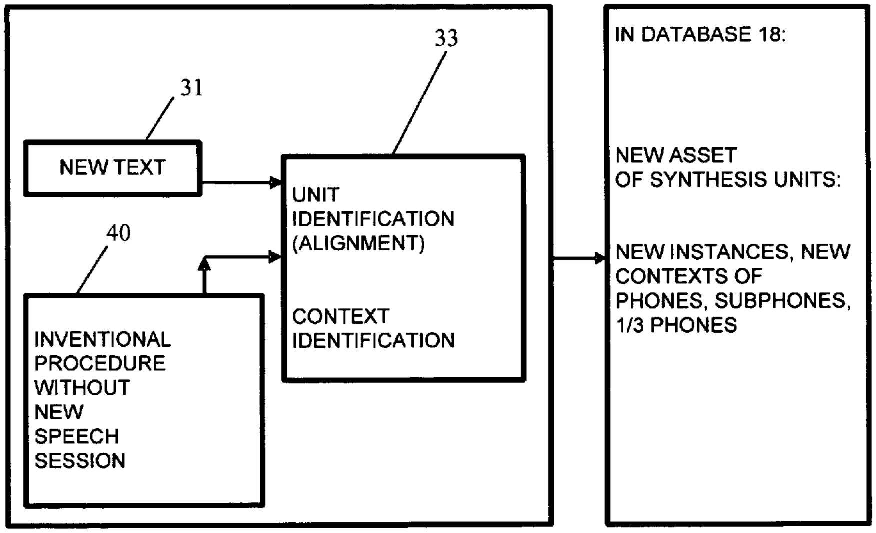
FIG. 4. is a schematic diagram for performing an update in accordance with an embodiment of the inventive arrangements disclosed herein.

The steps shown in FIG. 5 can be implemented in accordance with a variety of CTTS systems. Once such system or situation is illustrated in FIG. 4, which is a schematic diagram for performing an update in accordance with an embodiment of the inventive arrangements disclosed herein. FIG. 4 illustrates that an inventive software program can be implemented as a new feature within a modified synthesis engine (See item 16 of FIG. 1). The resulting synthesis engine can update a speech database (see item 18) in order to adapt it to a new, target application.

With additional reference to FIG. 4, application specific input text 31 can be provided to the modified synthesis engine, which performs the method depicted in block 40. The single steps of the procedure 40 are depicted in FIG. 5, and additional references are made to FIG. 6, which depicts an exemplary portion of the general domain synthesizer's decision tree together with the stored questions and speech segments.

Specifically, the method begins with a decision 440 to perform an update of the speech database. The context identification step 450 is implemented in the program component—which can be a part of the synthesis engine. The program component can use a pre-existing general domain synthesizer with decision trees shown in FIG. 6 for analyzing the acoustic and/or prosodic contexts of the above mentioned adaptation corpus 31. The exemplary contexts and the numerous further contexts not depicted in the drawing build up the context classes.

Figure 6:
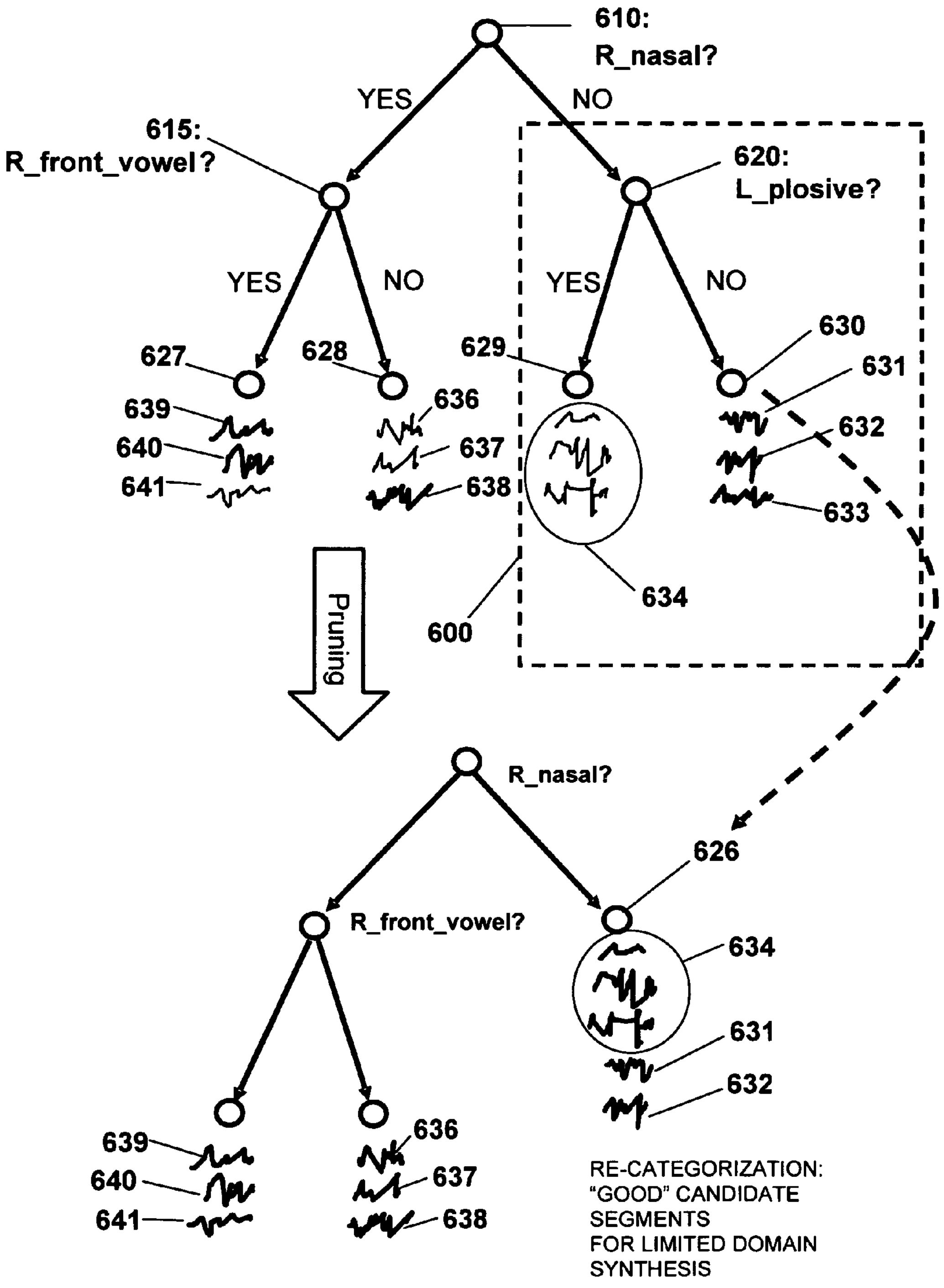
FIG. 6 is a schematic diagram depicting a domain synthesizer's decision tree together with the stored questions and speech segments in accordance with an embodiment of the inventive arrangements disclosed herein.

FIG. 6 is a schematic diagram depicting a domain synthesizer's decision tree together with the stored questions and speech segments in accordance with an embodiment of the inventive arrangements disclosed herein. In FIG. 6, the decision tree leaves 627, 628, 629, 630 and 626 are called "contexts"; reference numbers 631-641 are referred to as "speech segments", thus having a specific context, i.e., the leaf node under which they are inserted in the tree.

In a context identification 450 the following actions can be performed:

a) run the general domain synthesizer's front-end to obtain a phonetic/prosodic description, i.e. baseforms and intonation contours, of the adaptation corpus b) traverse the decision tree, as described above, for each requested phone or sub-phone until a leaf node is reached and increase a counter associated with each decision tree leaf, c) compare the above mentioned counters to a predetermined and adjustable threshold.

As a result, two disjointed sets of decision tree leaves can be obtained. A first one having counter values above the threshold. The second one with counter values below the threshold. Leaves 627, 628, 629 in the first set can carry the speech segments 634 and 636, . . . , 641 for acoustic and/or prosodic contexts present in the application specific new text. Leaf 630 from the second set can contain speech segments 631, . . . , 633 that are not accessible by the new application due to the previously mentioned context mismatch of training data and new application.

In the decision tree adaptation step 460, an adaptation software program can perform a decision tree adaptation procedure which is best implemented as an iterative process that discards and/or creates acoustic contexts based on the information collected in the precedent context identification step 450. Assuming a binary decision tree, we can distinguish three different situations:

1) Both of two leaves with a common parent node are unused, i.e., have counters with values below a fixed threshold. In this case the counters from both leaves are combined (added) into a new counter. The two leaves are discarded, and the associated speech segments are attached to the parent node. The latter now becomes a new leaf that represents a coarser acoustic context with a new usage counter.

2) One of two leaves with a common parent node is unused: the same action as in the first case is taken. This situation is depicted in the upper part of FIG. 6 for the unused leaf 630 and parent node 620 in the right branch of the tree.

3) Both of two leaves with a common parent node are used: In this case, depicted in the upper part of FIG. 6 for parent node 615, the differentiation of contexts provided by the original decision tree is also present in the phonetic notation of the adaptation data. Thus, both leaves are either kept or further refined by means of state-of-the-art decision tree growing.

By comparing the new leaves' usage counters to a new threshold (which may be different to the previous one), the process creates two new sets of (un-)used leaves in each iteration. The process stops if either further pruning is not applicable or if a stop criterion is reached. For example, the step criterion can occur once a predefined number of leaves, or speech segments per leaf, is reached.

The lower part of FIG. 6 depicts the result of decision tree adaptation: as obvious to the skilled reader, the pruning step renders the acoustic context temporarily coarser than present in the basic speech database, thereby making available the previously not reachable speech segments 631 and 632 in a new walk through the adapted decision tree. As depicted in FIG. 6, according to experiments performed by the inventors the process described here creates smaller decision trees and thus increases the number of speech segments attached to each leaf. Since this usually results in more candidate segments to be considered by the back-end search, state-of-the-art data driven pre-selection based on the adaptation corpus can be additionally used to reduce the number of speech segments per leaf in the re-categorized tree structure and thus for a reduction of the computational load. In FIG. 6, this situation is depicted by the suppression of speech segment 633.

Then, in a final adaptation step 470 the program component re-builds the speech database storing all the speech segments by means of a re-indexing procedure, which transforms the new tree structure into a respective new database structure having a new arrangement of table indexes.

Finally, the speech database is completely updated in step 480, still comprising only the original speech segments, but now being organized according to the characteristic acoustic and/or prosodic contexts of the new domain. Thus, the adapted database and decision tree can be used instead of their general domain counterparts in normal runtime operation mode.

Figure 7:
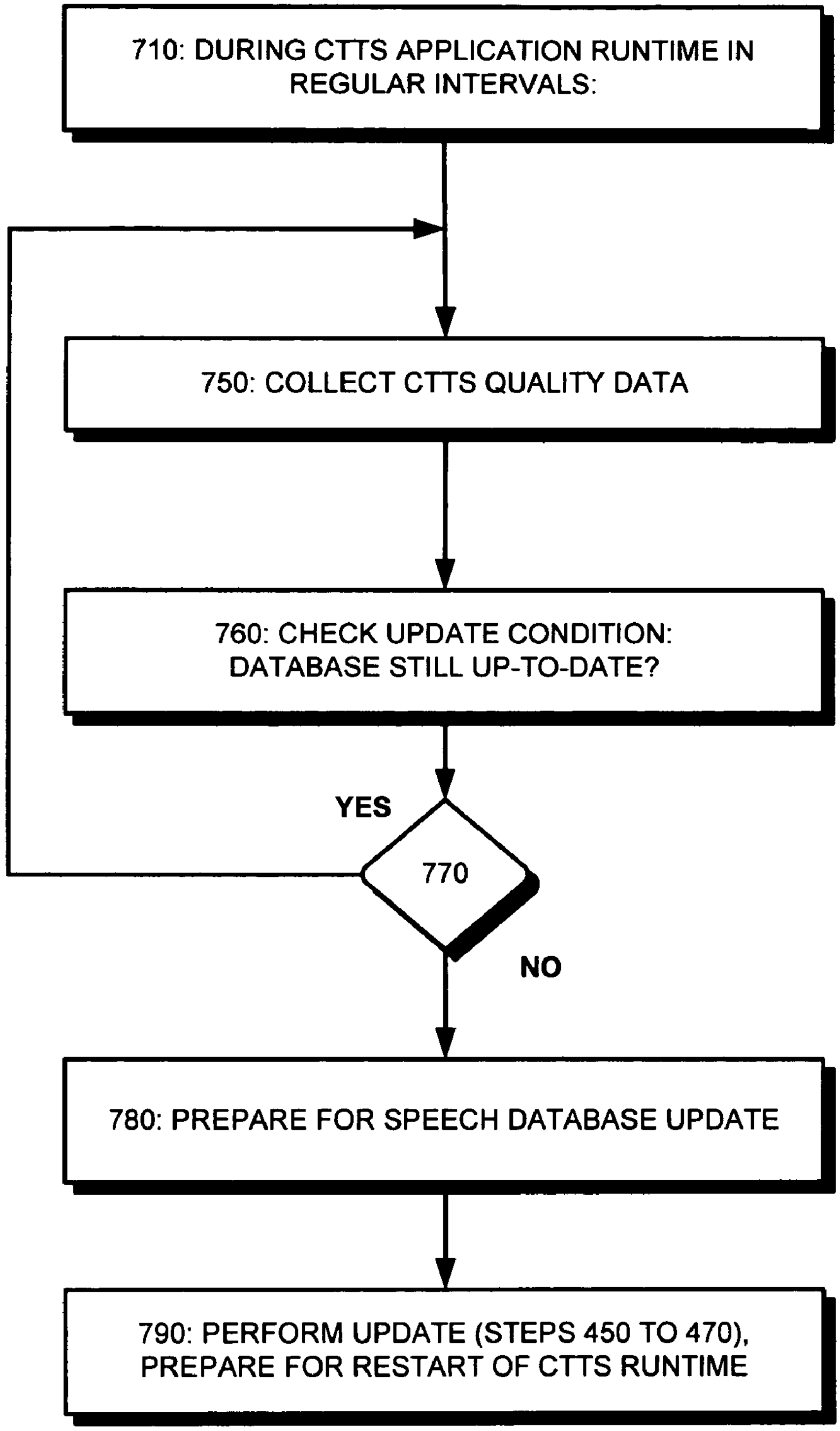
FIG. 7 is a control flow diagram of runtime steps performed to improve performance of one embodiment of the invention detailed herein.

FIG. 7 is a control flow diagram of runtime steps performed to improve performance of one embodiment of the invention detailed herein. Steps of FIG. 7 can be performed during CTTS application runtime in regular intervals, as shown by step 710. The decision for performing a database adaptation can be achieved by a procedure which is executed in regular intervals, e.g., after the synthesis of a predetermined number of words, phrases, or sentences, and which basically includes:

a) the collection of some data describing the synthesizer's behavior that has been found useful for an assessment of the quality of the synthetic output speech, i.e., "descriptive data", b) the activation of a speech database update procedure as described above, preferably without human intervention, if above mentioned data meets a predetermined condition.

The descriptive data mentioned above can include, but is not limited to, any (combination) of the following:

a) the average number of non-contiguous speech segments that are used for the generation of the output speech, b) the average synthesis costs, i.e., the average value of the cost function used for the final selection of speech segments from the list of candidate segments, c) the average number of decision tree leaves (or, in other words, acoustic/prosodic contexts) that are visited, if the list of candidate speech segments is computed.

During application runtime, the synthesis engine collects the above-mentioned descriptive data, which allows the judgment of the quality of the CTTS system and are thus called CTTS quality data (step 750). The CTTS quality data can be checked against a predetermined CTTS update condition 760.

If the condition is not met, the system continues to synthesize speech using the current (original) versions of the acoustic/prosodic decision trees and speech segment database (see the YES-branch in block 770). Otherwise (NO-Branch) the current version of the system is considered as being not sufficient for the given application, and in a step 780 the CTTS system is prepared for a database update procedure. This preparation can be implemented by defining a time during run-time, where it can be reasonably expected that the update-procedure does not interrupt a current CTTS application session.

Thus, as a skilled reader may appreciate, the foregoing embodiment of the present invention offers an improved quality of synthetic speech output for a particular application or domain without imposing restrictions on the synthesizer's universality and without the need of additional speech recordings.

It should be noted that the term "application" as used in this disclosure does not necessarily refer to a single task with a static set of prompts, but can also refer to a set of different, dynamically changing applications, e.g., a set of voice portlets in a web portal application such as the WebSphere® Voice Application Access environment. It is further important to note that in the case of a multilingual text-to-speech system, these applications are not required to output speech in one and the same language.

The present invention can be realized in hardware, software, or a combination of hardware and software. A synthesis tool, according to the present invention, can be realized in a centralized fashion in one computer system or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following:

a) conversion to another language, code, or notation; and b) reproduction in a different material form.

What is claimed is:

1. A method for use in a Concatenative Text-To-Speech (CTTS) system that comprises a speech segment database comprising a plurality of speech segments organized in accordance with a context hierarchy, the method comprising:

evaluating the context hierarchy by using new text and at least one processor, wherein the context hierarchy comprises a plurality of contexts determined using a base text, wherein each of the plurality of speech segments is associated with at least one of the plurality of contexts in the context hierarchy, and wherein the new text is different from the base text, wherein at least a portion of the new text has no corresponding acoustic data used during the evaluation;

updating the context hierarchy, based on results of evaluating the context hierarchy by using the new text, by merging two contexts in the context hierarchy to form a new coarser context and/or by splitting a context in the context hierarchy to form at least two new refined contexts; and reorganizing the plurality of speech segments in accordance with the updated context hierarchy.

2. The method of claim 1, wherein the plurality of contexts comprises a first context;

wherein the evaluating the context hierarchy comprises determining a value indicative of a number of times the first context is present in the new text; and wherein the updating the context hierarchy comprises, in response to determining that the value is below a threshold, merging the first context with a second context in the context hierarchy.

3. The method of claim 2, wherein merging the first context with the second context comprises creating a new merged context associated with speech segments associated with the first context and speech segments associated with the second context.

4. The method of claim 1, wherein the plurality of contexts comprises a second context;

wherein the evaluating the context hierarchy comprises determining a value indicative of a number of times the second context is present in the new text; and wherein the updating the context hierarchy comprises, in response to determining that the value is above a threshold, splitting the second context to form the at least two new refined contexts.

5. The method of claim 1, wherein the context hierarchy is a decision tree comprising a plurality of leaf nodes, wherein each leaf node in the plurality of leaf nodes is associated with a context in the plurality of contexts, and wherein updating the context hierarchy comprises changing the structure of the decision tree.

6. The method of claim 1, wherein updating the context hierarchy is performed without using any new speech segments.

7. The method of claim 1, further comprising:

selecting, by using the updated context hierarchy, speech segments in the plurality of speech segments for synthesizing speech corresponding to at least one text utterance; and synthesizing speech corresponding to the at least one text utterance by using the selected speech segments.

8. The method of claim 1, further comprising:

analyzing data indicative of quality of output speech synthesized in accordance with the context hierarchy to determine that the evaluating, updating, and reorganizing should be performed, wherein the evaluating, updating, and reorganizing are performed in response to determining that the evaluating, updating, and reorganizing should be performed.

9. The method of claim 8, wherein the data indicative of quality of the output speech comprises data selected from the group consisting of a number of non-contiguous speech segments used to synthesize the output speech, a cost associated with speech segments used to synthesize the output speech, and a number of acoustic and/or prosodic contexts used to synthesize the output speech.

10. A recording medium storing processor-executable instructions that, when executed by at least one processor, cause the at least one processor to perform a method for use in a Concatenative Text-To-Speech (CTTS) system that comprises a speech segment database comprising a plurality of speech segments organized in accordance with a context hierarchy, the method comprising:

evaluating the context hierarchy by using new text, wherein the context hierarchy comprises a plurality of contexts determined using a base text, wherein each of the plurality of speech segments is associated with at least one of the plurality of contexts in the context hierarchy, and wherein the new text is different from the base text, wherein at least a portion of the new text has no corresponding acoustic data used during the evaluation;

updating the context hierarchy, based on results of evaluating the context hierarchy by using the new text, by merging two contexts in the context hierarchy to form a new coarser context and/or by splitting a context in the context hierarchy to form at least two new refined contexts; and reorganizing the plurality of speech segments in accordance with the updated context hierarchy.

11. The recording medium of claim 10, wherein the plurality of contexts comprises a first context;

wherein the evaluating the context hierarchy comprises determining a value indicative of a number of times the first context is present in the new text; and wherein the updating the context hierarchy comprises, in response to determining that the value is below a threshold, merging the first context with a second context in the context hierarchy.

12. The recording medium of claim 10, wherein the plurality of contexts comprises a second context;

wherein the evaluating the context hierarchy comprises determining a value indicative of a number of times the second context is present in the new text; and wherein the updating the context hierarchy comprises, in response to determining that the value is above a threshold, splitting the second context to form the at least two new refined contexts.

13. The recording medium of claim 10, wherein the context hierarchy is a decision tree comprising a plurality of leaf nodes, wherein each leaf node in the plurality of leaf nodes is associated with a context in the plurality of contexts, and wherein updating the context hierarchy comprises changing the structure of the decision tree.

14. The recording medium of claim 10, wherein updating the context hierarchy is performed without using any new speech segments.

15. The recording medium of claim 10, wherein the method further comprises:

analyzing data indicative of quality of output speech synthesized in accordance with the context hierarchy to determine that the evaluating, updating, and reorganizing should be performed, wherein the evaluating, updating, and reorganizing are performed in response to determining that the evaluating, updating, and reorganizing should be performed.

16. The recording medium of claim 15, wherein the data indicative of quality of the output speech comprises data selected from the group consisting of a number of non-contiguous speech segments used to synthesize the output speech, a cost associated with speech segments used to synthesize the output speech, and a number of acoustic and/or prosodic contexts used to synthesize the output speech.

17. A Concatenative Text-To-Speech (CTTS) system comprising:

at least one memory that stores a speech segment database comprising a plurality of speech segments organized in accordance with a context hierarchy; and at least one processor, coupled to the at least one memory, that:

evaluates the context hierarchy by using new text, wherein the context hierarchy comprises a plurality of contexts determined using a base text, wherein each of the plurality of speech segments is associated with at least one of the plurality of contexts in the context hierarchy, and wherein the new text is different from the base text, wherein at least a portion of the new text has no corresponding acoustic data used during the evaluation;

updates the context hierarchy, based on results of evaluating the context hierarchy by using the new text, by merging two contexts in the context hierarchy to form a new coarser context and/or by splitting a context in the context hierarchy to form at least two new refined contexts; and reorganizes the plurality of speech segments in accordance with the updated context hierarchy.

18. The CTTS system of claim 17, wherein the plurality of contexts comprises a first context;

wherein the at least one processor evaluates the context hierarchy by determining a value indicative of a number of times the first context is present in the new text; and wherein the at least one processor updates the context hierarchy by, in response to determining that the value is below a threshold, merging the first context with a second context in the context hierarchy.

19. The CTTS system of claim 17, wherein the plurality of contexts comprises a second context;

wherein the at least one processor evaluates the context hierarchy by determining a value indicative of a number of times the second context is present in the new text; and wherein the at least one processor updates the context hierarchy by, in response to determining that the value is above a threshold, splitting the second context to form the at least two new refined contexts.

20. The CTTS system of claim 17, wherein the context hierarchy is a decision tree comprising a plurality of leaf nodes, wherein each leaf node in the plurality of leaf nodes is associated with a context in the plurality of contexts, and wherein the at least one processor updates the context hierarchy by changing the structure of the decision tree.

21. The CTTS system of claim 17, wherein the at least one processor updates the context hierarchy without using any new speech segments.

22. The CTTS system of claim 17, wherein the at least one processor further:

selects, by using the updated context hierarchy, speech segments in the plurality of speech segments for synthesizing speech corresponding to at least one text utterance; and synthesizes speech corresponding to the at least one text utterance by using the selected speech segments.

23. The CTTS system of claim 17, wherein the at least one processor further:

analyzes data indicative of quality of output speech synthesized in accordance with the context hierarchy to determine that the evaluating, updating, and reorganizing should be performed, wherein the at least one processor performs the evaluating, updating, and reorganizing in response to determining that the evaluating, updating, and reorganizing should be performed.

24. The CTTS system of claim 17, wherein the at least one processor analyzes data indicative of quality of output speech synthesized in accordance with the context hierarchy to determine that the evaluating, updating, and reorganizing should be performed, wherein the evaluating, updating, and reorganizing are performed in response to determining that the evaluating, updating, and reorganizing should be performed.

25. The CTTS system of claim 24, wherein the data indicative of quality of the output speech comprises data selected from the group consisting of a number of non-contiguous speech segments used to synthesize the output speech, a cost associated with speech segments used to synthesize the output speech, and a number of acoustic and/or prosodic contexts used to synthesize the output speech.

* * * * *